United States Patent [19]

Lang et al.

[11] Patent Number: 4,605,287
[45] Date of Patent: Aug. 12, 1986

[54] SURGICAL MICROSCOPE FOR TWO SURGEONS

[75] Inventors: Walter H. Lang, Königsbronn; Klaus Biber, Aalen; Ulrich Lemcke; Ulrich Sander, both of Heidenheim, all of Fed. Rep. of Germany

[73] Assignee: Carl-Zeiss-Stiftung, Heidenheim, Fed. Rep. of Germany

[21] Appl. No.: 647,623

[22] Filed: Sep. 5, 1984

[30] Foreign Application Priority Data

Sep. 16, 1983 [DE] Fed. Rep. of Germany ....... 3333471

[51] Int. Cl.⁴ ............................................. G02B 21/18
[52] U.S. Cl. .................................... 350/513; 350/522; 350/276 SL
[58] Field of Search ............... 350/513, 514, 515, 516, 350/522, 527, 526, 523, 276 R, 502, 508, 507, 574, 164, 163, 276 SL

[56] References Cited

U.S. PATENT DOCUMENTS

| 2,349,457 | 5/1944 | Osterberg et al. | 350/164 |
| 3,984,157 | 10/1976 | LeVantine | 350/276 SL |
| 4,185,902 | 1/1980 | Plaot | 350/276 SL |

FOREIGN PATENT DOCUMENTS 1217099  5/1966  Fed. Rep. of Germany ...... 350/514

Primary Examiner—Jon W. Henry
Attorney, Agent, or Firm—Walter Ottesen

[57] ABSTRACT

The invention is directed to a double microscope for a surgeon and an assistant. The double microscope includes an optical splitter plate which splits the light coming from the operation field and directs the split beams to the two microscopes. The optical splitter plate, together with the objective of the assistant microscope and a beam deflection element, are all accommodated in a component connecting the two microscopes.

7 Claims, 4 Drawing Figures

SURGICAL MICROSCOPE FOR TWO SURGEONS

FIELD OF THE INVENTION

The invention relates to two optically-mechanically coupled surgical or operating microscopes wherein the viewing beam paths pass through a common optical element.

BACKGROUND OF THE INVENTION

Certain microsurgical interventions, for example, in hand surgery, cannot be executed by a single surgeon; they require the cooperation of at least one assistant. In this case, it is absolutely mandatory for the microscope of the assisting surgeon to be largely identical to the microscope of the responsible surgeon. In particular, it is necessary for both surgical microscopes to have the same stereo base and the same or at least approximately same viewing angle relative to the operation field.

U.S. Pat. Nos. 4,138,191 and 4,167,302 disclose surgical microscopes for two observers. It is a disadvantage in these surgical microscopes that either they do not permit the viewing angle between the two microscopes to be changed or, if they do, they require a complex arrangement of beam splitting and deflecting prisms.

SUMMARY OF THE INVENTION

It is an object of the invention to provide, with minimal expense as to the optics required, a surgical microscope which can be utilized by two surgeons simultaneously and the two observation tubes of which are adjustable with respect to each other to any desired viewing angle.

In the surgical microscope of the invention, the viewing beam which traces a path from the object field passes through an optical splitter system directing the light to the objectives of the two surgical microscopes. A further feature of the invention provides that one of the two surgical microscopes is pivotally mounted to rotate about the optical axis of the other surgical microscope.

The optical splitter system may be a beam splitter cube or, in a particularly suitable embodiment, an optical splitter plate which splits the impinging light into a reflected portion and a transmitted portion.

In an advantageous embodiment of the invention, the optical splitter system, together with the objective of one of the operating microscopes and a deflecting mirror, are all accommodated in a component that is detachable from the other one of the operating microscopes.

In another advantageous embodiment, a light filter acting as a light trap is mounted behind the splitter system so as to be inclined with respect to the optical axis whereby an optimum suppression of reflections is obtained.

Magnification changers known per se may be arranged between the microscope objectives and the binocular tubes associated therewith. This arrangement may involve known multistage Galilean changers or zoom systems. A combination of a zoom system for the one surgical microscope and a Galilean changer for the other microscope is also possible. Further, magnification changers having three optical channels may be used, of which only two channels are required for the microscopes. In this case, the third channel may be used by a third observer and/or for documentation purposes.

The advantages achieved with the invention are particularly that the opto-mechanically coupled surgical microscopes are suitable for use in all areas of microsurgery wherein either surgeon and assistant are seated opposite one another or the viewing angle of the assistant microscope is to include any angle between 30° and 180° relative to the surgeon's microscope. Another advantage is the modular construction of the device of the invention permitting, for example, the use of another stereo member above the magnification changer of an operating microscope whereby a triploscope may be obtained. The use of ocular tubes having different viewing angles is also possible.

BRIEF DESCRIPTION OF THE DRAWING

An embodiment of the invention will now be described with reference to the drawing wherein.

DESCRIPTION OF THE PREFERRED EMBODIMENTS OF THE INVENTION

Figure 1:
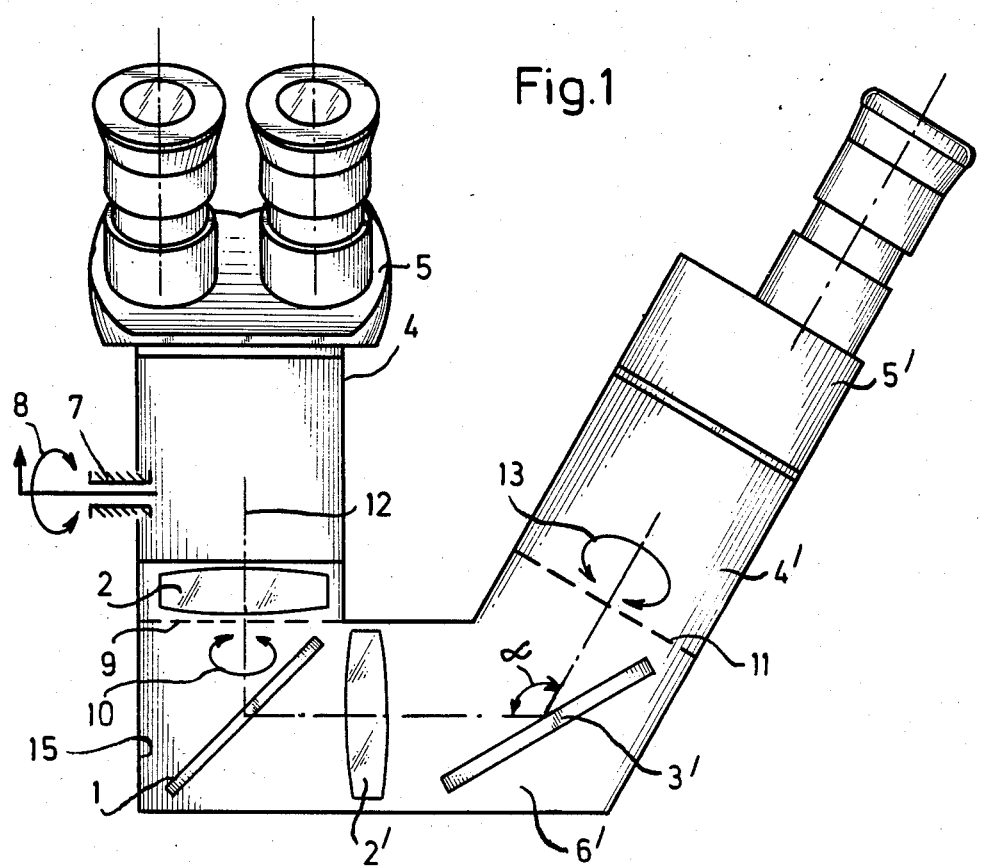
FIG. 1 is a schematic of the double microscope of the invention, wherein the viewing angle between the two microscopes is 90°.

In FIG. 1, reference numerals 5 and 5' denote the eyepiece tubes of the double microscope. The magnification changers are accommodated in components 4 and 4', respectively. A possibility to mount the microscope on a stand permitting its rotation in the direction of arrow 8 is provided in the microscope housing at 7.

Reference numerals 2 and 2' identify the objectives for the surgeon's microscope and the assistant's microscope, respectively. Objective 2', together with a deflecting mirror 3' and an optical splitter plate 1, are accommodated in housing component 6' which is adapted to be connected with the surgeon's microscope at partition 9 and with the assistant's microscope at partition 11. Component 6' is rotatable in the direction of arrow 10 about the optical axis 12 of the surgeon's microscope. Eyepiece tube 5' of the assistant's microscope is rotatable through an angle of 360° in the direction of arrow 13.

Figure 2:
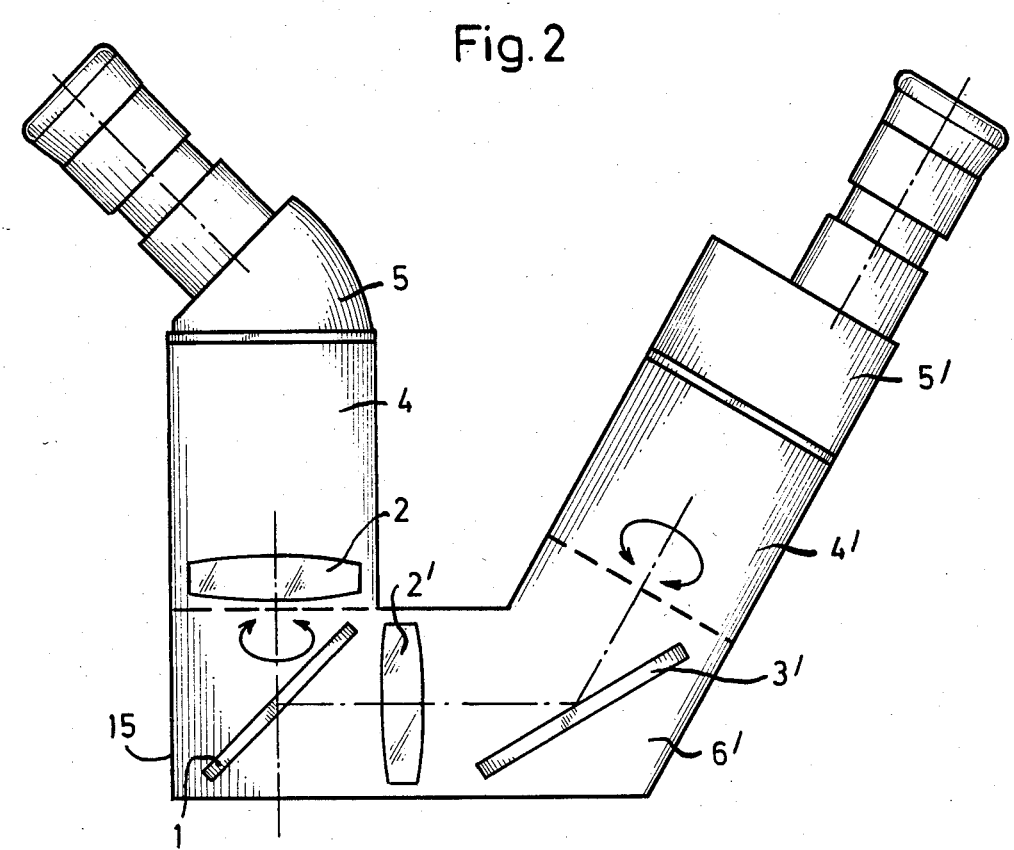
FIG. 2 is a schematic of the double microscope of the invention, wherein the viewing angle between the two microscopes is 180°.

In FIG. 2, like parts have been assigned like reference numerals as in FIG. 1.

Figure 3:
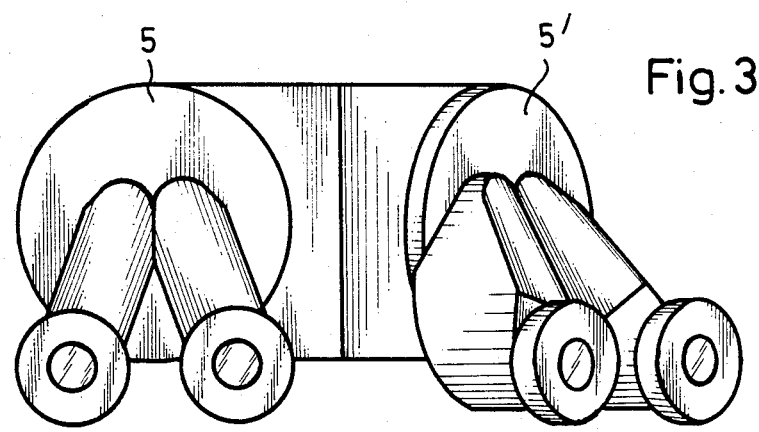
FIG. 3 is a top plan view, taken from the eyepiece side, of a double microscope of FIG. 1 of the invention, wherein the viewing angle between the two microscopes is set to 30° by rotating one of the microscopes; and, FIG. 4 is a schematic showing the arrangement of a light filter acting as a light trap in the beam path.

FIG. 3 illustrates a double microscope of the invention as it is suitable for use in plexus operations. In this embodiment, the surgeon's microscope is equipped with two straight tubes.

In order to make work still more comfortable for both surgeons, the viewing angle between the two microscopes is adjustable.

Figure 4:
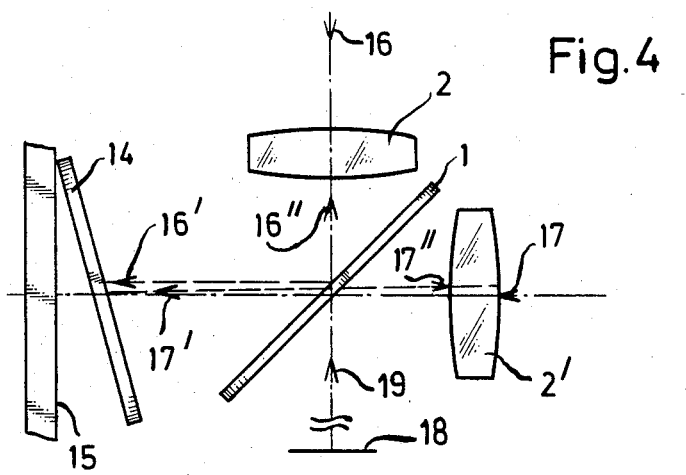

FIG. 4 shows the principle of coaxial illumination wherein the illuminating beam path 16, 17 passes through the same optical system as the viewing beam path 19. After passing through objectives 2 and 2', the illuminating beam paths identified by arrows 16 and 17 impinge upon the object field plane 18. As a result of partial reflection 16' and partial passage 17' at optical splitter plate 1, surface 15 in the interior of the microscope housing is also illuminated. The light is reflected from this surface 15 into objectives 2 and 2' (16", 17"), producing a very low-contrast image. This is remedied by having the filter 14 absorb the light impinging on surface 15 to such a high extent that only the light reflected at the air-filter boundary surface is permitted to reach the viewing beam path. This boundary surface reflection is still further reduced by antireflection. By suitably tilting the filter, any residual reflection is directed in such a manner that it cannot be observed through either objective 2 or objective 2'.

It is understood that the foregoing description is that of the preferred embodiments of the invention and that various changes and modifications may be made thereto without departing from the spirit and scope of the invention as defined in the appended claims.

What is claimed is:

1. A surgical microscope device for viewing an operating region of the body by two surgeons for performing surgery thereon, the device comprising:
   a first microscope for an operating surgeon having a first objective defining a first optical axis;
   a second microscope for an assistant surgeon having a second objective defining a second optical axis;
   optical splitter means common to both said microscopes for splitting the light from the operating region and directing the light beams split therefrom to said objectives, respectively, thereby defining respective viewing beam paths for said microscopes;
   an opto-mechanical component for accommodating said splitter means therein and for mounting said second microscope to said first microscope so as to permit said splitter means and said second microscope to be conjointly rotatable about said first optical axis relative to said first microscope whereby the assistant surgeon can change the viewing direction through said second microscope relative to the viewing direction of the operating surgeon through said first microscope; and,
   said second microscope having occular means mounted thereon so as to be rotatable about said second optical axis thereby permitting the assistant surgeon to adapt the position of said ocular means to the new viewing direction.

2. The surgical microscope of claim 1, said first objective being disposed at a predetermined distance from said splitter means and said second objective being mounted in said component and spaced from said splitter means by an amount equal to said distance whereby both objectives have the same focal length and effect the same enlargement.

3. The surgical microscope device of claim 1, said component being removable and said second objective being mounted in said component; said device further comprising a deflection mirror also mounted in said component for deflecting the light passing along the beam path of said second microscope.

4. The surgical microscope device of claim 1, said optical splitter means being an optical splitter plate for splitting the light impinging thereon into a first portion reflected thereby and a second portion transmitted therethrough.

5. The surgical microscope device of claim 4, comprising light trap means mounted adjacent said optical splitter plate for receiving and absorbing light reflected and transmitted out of said beam paths by said splitter plate.

6. The surgical microscope of claim 5, said light reflected and transmitted out of said beam paths being directed along a predetermined optical axis, said splitter plate being inclined with respect to said last-mentioned axis.

7. A surgical microscope device for viewing an operating region of the body by two surgeons for performing surgery thereon, the device comprising:
   a first microscope for an operating surgeon having a first ojective defining a first optical axis;
   a second microscope for an assistant surgeon having a second objective defining a second optical axis;
   optical splitter means common to both said microscopes for splitting the light from the operating region and directing the light beams split therefrom to said objectives, respectively, thereby defining respective viewing beam paths for said microscopes;
   an opto-mechanical component for accommodating said splitter means therein and for mounting said second microscope to said first microscope so as to permit said splitter means and said second microscope to be conjointly rotatable about said first optical axis relative to said first microscope whereby the assistant surgeon can change the viewing direction through said second microscope relative to the viewing direction of the operating surgeon through said first microscope; and,
   said first objective being disposed at a predetermined distance from said splitter means and said second objective being mounted in said component and spaced from said splitter means by an amount equal to said distance whereby both objectives have the same focal length and effect the same enlargement.

* * * * *